UNITED STATES PATENT OFFICE.

WALTER GLAESER, OF BROOKLYN, NEW YORK, ASSIGNOR TO POTASH EXTRACTION CORPORATION, OF NEW YORK, N. Y., A CORPORATION OF NEW YORK.

EXTRACTION OF POTASSIUM COMPOUNDS.

1,422,848.  Specification of Letters Patent.  Patented July 18, 1922.

No Drawing.  Application filed June 7, 1918. Serial No. 238,768.

*To all whom it may concern:*

Be it known that I, WALTER GLAESER, a subject of the German Emperor (holding first papers of citizenship of the United States), and a resident of Brooklyn, county of Kings, and State of New York, have invented a new and useful Improvement in the Extraction of Potassium Compounds, of which the following is a specification, the principle of the invention being herein explained and the best mode in which I have contemplated applying that principle, so as to distinguish it from other inventions.

The present invention, relating, as indicated, to potassium extraction, is particularly directed to a simple and economical means for recovering the equivalent of the greater part of the calcium chloride used in the method described in my Patent No. 1,254,677, issued January 29, 1918. A further object of the invention is the provision of a method for not only recovering this reagent, but also for adding to the amount of the potassium obtained in the method above named, and of a method for increasing the available amount of water soluble potassium compounds in the mixture. The present invention may broadly be considered as an improved method of separating heavy metal or alkaline earth metal chlorides from light metal chlorides, such as potassium, sodium, lithium and the like. To the accomplishment of the foregoing and related ends, said invention, then, consists of the means hereinafter fully described and particularly pointed out in the claims.

The following description sets forth in detail one approved method of carrying out the invention, such disclosed mode, however, constituting but one of the various ways in which the principle of the invention may be used.

In my process above referred to the potassium content of the potassium-bearing silicates may be converted into a water soluble form by the treatment of the potassium-containing silicate with a large excess of calcium chloride in the presence of a contact substance, such as coke and iron oxide under the exclusion of air at a considerable temperature which causes the conversion of the potassium present into water soluble potassium chloride. In order to shorten the period of heating a large excess of calcium chloride is used, up to 60 to 80 per cent of the weight of the silicate, and the greater part of this calcium chloride is left unchanged in the mixture which is discharged after the treatment of the silicate by the foregoing process. It is to the recovery of this calcium chloride in an equally valuable and available form that the present process is directed with the added advantage of increasing the available amount of water soluble potassium compounds in the mixture.

The mixture obtained by the above process, or an equivalent mixture, since the exact source of such a mixture is not essential, is treated with water, and then evaporated to dryness, leaving solid calcium chloride, potassium chloride and ferrous chloride. This mixture extracted from the solution is then mixed with powdered alunite. The treatment with water removes the chlorides named from the silicate, which is insoluble and greatly reduces the bulk of the material to be treated. I add alunite in sufficient quantity to carry out the following reactions. Alunite is a basic sulphate of potassium and aluminum of approximately the formula—

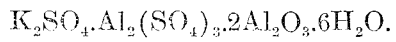

$$K_2SO_4.Al_2(SO_4)_3.2Al_2O_3.6H_2O.$$

The alunite mixed with the material from the product obtained from the extraction process, is then heated in a muffle furnace or open kiln in an atmosphere of water steam and in absence of air. As is well known, alunite splits up at about 700 to 800 degrees C. into alumina, potassium sulphate and sulphuric acid. The sulphuric acid reacts upon the calcium chloride present according to the following equation to form calcium sulphate and hydrochloric acid, the latter being in a gaseous condition.

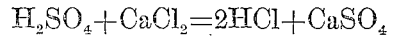

$$H_2SO_4 + CaCl_2 = 2HCl + CaSO_4$$

(Part of hydrochloric acid acts in status nascendi upon some of the alunite.)

Hydrochloric acid may be led away from the muffle or kiln and collected by condensation in any suitable manner. The residue in the furnace or kiln contains no calcium chloride, but has its original water soluble potassium chloride in the same condition, that is, water soluble, while the alunite having been broken down, the potassium sulphate contained in the alunite is now present as water soluble potassium sulphate, and thus the amount of water soluble or available potassium salts in the mixture has been increased by the quantity of potassium sulphate contained in the alunite added to the mixture.

The amounts of alunite and of the mixture which should be used are approximately determined by the combining weights of the proportion of the alunite reacting and the calcium chloride present, which determines the amount of free hydrochloric acid produced by the breaking up of the alunite. Thus, roughly, about twice as much alunite must be used as there is calcium chloride in the mixture. The subsequent treatment to remove the water soluble potassium compounds form no part of the present invention and any suitable method may be employed for removing and concentrating these compounds, or, if desired, the entire mass may be used as a fertilizer.

The most convenient separation method consists in leaching out the water soluble potassium compounds.

This process seems to recover the calcium chloride (or its equivalent amount of hydrochloric acid) and also increases the water soluble potassium compounds in the residue which is an important consideration. The process is, furthermore, relatively inexpensive in comparison with the products and savings which are secured, and greatly reduces the total cost of extracting the potassium in water soluble form from the insoluble potassium-bearing silicates.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:

1. In a method of making hydrochloric acid, the steps which consist in heating calcium chloride with alunite in the presence of steam and then collecting the hydrochloric acid evolved.

2. In a method of making hydrochloric acid, the steps which consist in heating calcium chloride with alunite in the presence of steam at a temperature between 700 degrees and 800 degrees C., and then collecting the hydrochloric acid evolved.

3. In a method of making hydrochloric acid, the steps which consist in heating calcium chloride with alunite in the presence of steam at a temperature between 700 degrees and 800 degrees C. in a non-oxidizing atmosphere, and then collecting the hydrochloric acid gas evolved.

4. In a method of separating potassium chloride from alkaline earth metal chlorides, the step which consists in heating a mixture of such chlorides with alunite in the presence of steam.

5. In a method of separating potassium chloride from alkaline earth metal chlorides, the step which consists in heating a mixture of such chlorides with alunite in the presence of steam, at a temperature of about 700 degrees C. in a non-oxidizing atmosphere.

6. In a method of separating potassium chloride from alkaline earth metal chlorides, the steps which consist in heating a mixture of such chlorides with alunite in the presence of steam, at a temperature of about 700 degrees C. in a non-oxidizing atmosphere, and then leaching out the soluble potassium chloride from the residue.

Signed by me, this 29th day of May, 1918.

WALTER GLAESER.